United States Patent [19]

Jakubas

[11] Patent Number: 4,957,317
[45] Date of Patent: Sep. 18, 1990

[54] DRUM LOCK DEVICE
[75] Inventor: Gary P. Jakubas, Rutherford, N.J.
[73] Assignee: Taurus Precision, Inc., Totowa, N.J.
[21] Appl. No.: 515,637
[22] Filed: Apr. 27, 1990
[51] Int. Cl.⁵ .............................................. B65D 45/30
[52] U.S. Cl. ................................ 292/256.67; 411/402; 70/231
[58] Field of Search .......................... 70/231, 163, 164; 292/205, 256.6, 256.67, 256.69, 256.71; 81/121.1; 411/402, 407

[56] References Cited

U.S. PATENT DOCUMENTS

| 2,104,156 | 1/1938 | Fergueson | 292/256.67 |
| 2,526,238 | 10/1950 | Kendall | 292/256.27 |
| 3,349,947 | 10/1967 | Zumwalt | 292/252.71 |
| 3,515,423 | 6/1970 | DeSmidt | 292/256.71 |
| 3,903,769 | 9/1975 | Andersen | 81/121.1 |
| 3,907,349 | 9/1975 | Kane | 292/256.67 |

Primary Examiner—Robert L. Wolfe
Attorney, Agent, or Firm—Siegmar Silber

[57] ABSTRACT

A drum lock device is disclosed for an open-head drum which has a flanged lip at the open end with a mating lid therefor. The drum lock device has a lug-type ring closure, a lockable bolt, and a shuttle wrench captively held on the bolt by a cap. The ring closure, which annularly attaches the lid to the lip, has a split therethrough with internally threaded lugs on either side. The shuttle wrench is captively held between the cap and the apertured boss of the bolt, and is slidably positionable between engagement with and disengagement from the lockable bolt. When the shuttle wrench is engaged, the lockable bolt is enabled, and, when the shuttle wrench is disengaged the rotation of the lockable bolt is disabled.

20 Claims, 3 Drawing Sheets

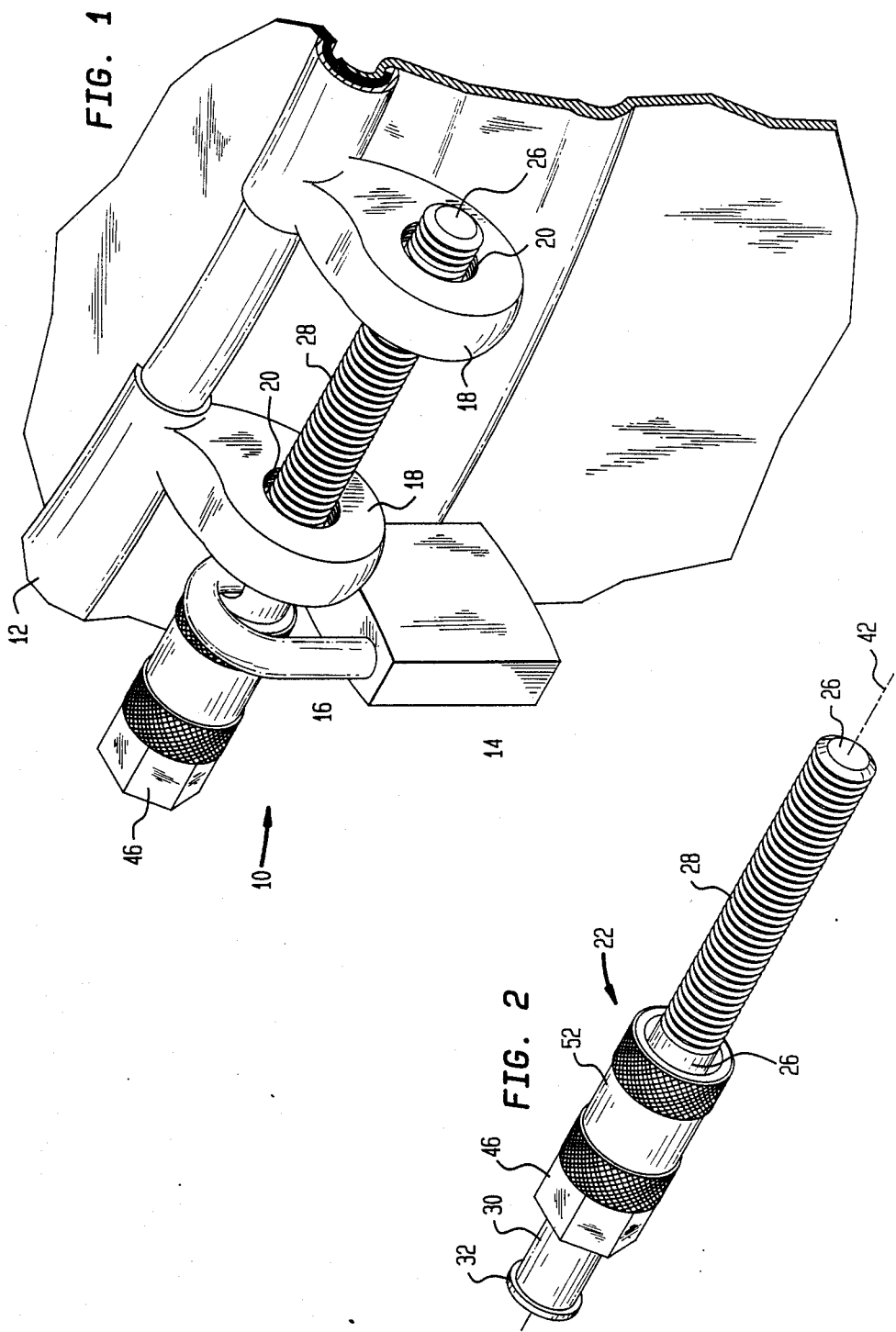

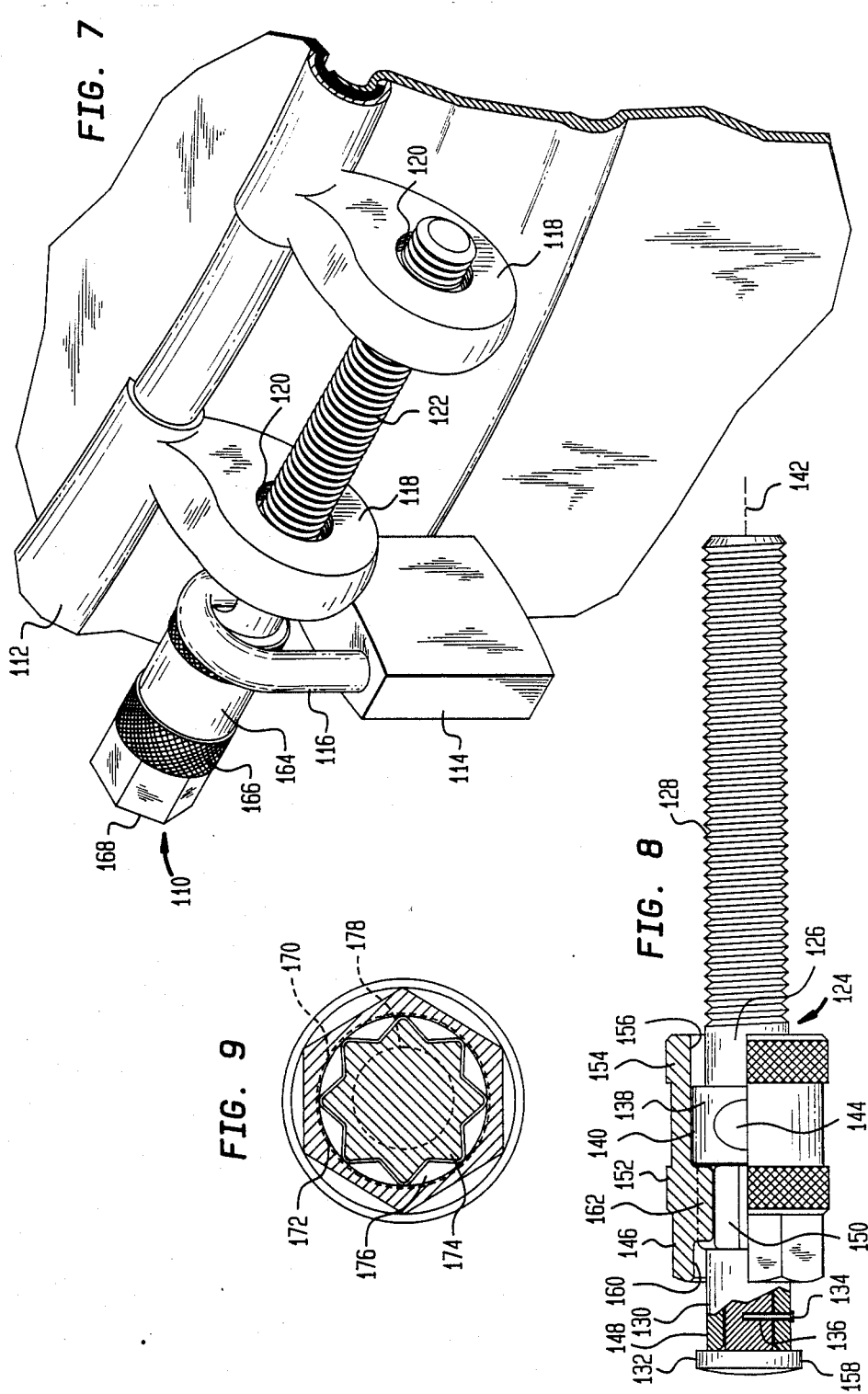

DRUM LOCK DEVICE

BACKGROUND OF THE INVENTION

1. Field of the Invention

This invention relates to a drum lock device for chemical- and hazardous-waste containers, and, more particularly, to a lockable bolt structure for an open-head drum wherein, upon a padlock being emplaced through the bolt, the driver portion of the bolt is covered by a free-spinning shroud.

2. Information Disclosure Statement

In preparing for this application, a pre-examination patentability search was performed. In the search, the following fields and respective periods covered were examined.

| CLASS/SUBCLASS | PERIOD COVERED |
| --- | --- |
| 70/164 | 07/23/1878 to 09/26/1989 |
| 70/165 | 02/26/1878 to 08/15/1989 |
| 70/230 | 05/31/1904 to 07/04/1989 |
| 70/231 | 09/18/1923 to 10/24/1989 |

Upon search, the following patents were uncovered:

| ITEM NO. | U.S. PAT. NO. | INVENTOR | ISSUE DATE |
| --- | --- | --- | --- |
| 1 | 1,467,254 | A. Tarbet | 09/04/1921 |
| 2 | 1,832,057 | E. G. Stein | 11/17/1931 |
| 3 | 2,526,238 | L. B. Kendall | 10/17/1950 |
| 4 | 4,300,373 | W. M. Camos et al | 11/17/1981 |
| 5 | 2,143,925 | M. J. Schlitters et al | 01/17/1939 |
| 6 | 4,302,137 | H. Hart | 11/24/1981 |
| 7 | 4,427,326 | S. C. Hobson, et al | 01/24/1984 |

In considering the various patents uncovered, Items 1 through 4 relate to a means of securing a closure ring. The patent to Camos et al, U.S. Pat. No. 4,300,373 (Camos '373), discloses the enclosing of the bolted connection between two flanged fittings commonly found in the oil and gas industry and known familiarly as a "Christmas tree".

The patents to Tarbet, U.S. Pat. No. 1,467,254 (Tarbet '254), and Kendall, U.S. Pat. No. 2,526,238 (Kendall '238) show retaining bands that annularly surround the closure cap and the flange upon which the cap rests.

Next, turning to Items 5, 6, and 7 various bolt structures are shown with shroud-like covers for the nut elements.

SUMMARY

In general terms, the invention disclosed hereby includes a drum lock is for 30-, 55- and 80-gallon drums for chemicals and hazardous materials. In the embodiment shown, such open-head steel drums are equipped with closure rings, the ends of which are fastened together by a standard D.O.T. $\frac{5}{8}$"-11 bolt. The locking device extends the shank of the bolt and provides a padlock shackle hole therethrough, a hex driver portion and a free-spin portion. Additionally, a sliding barrel with a broached hex section is slidably mounted on the extended bolt. The sliding barrel has at one end thereof a hex fitting to drive the bolt when suitably engaged. The sliding bar functions in two positions, when the drum is locked, that is with a padlock shackle placed through the shackle opening, the sliding barrel is forced to a free-spinning position (the I.D. of the broached hex section being larger than the spin-free section of the extension bolt). When the padlock is removed, the sliding bar is moved downwards over the bolt covering the shackle opening with the hex head engaging the hex driver section of the bolt.

The drum lock device of this invention is for an open-head drum which has a flanged lip at the open end with a mating lid therefor. The drum lock device has a lug-type ring closure, a lockable bolt, and a shuttle wrench captively held on the bolt by a cap. The lug-type ring closure is for annularly attaching the lid to the lip. The ring closure has a split therethrough with internally threaded lugs on either side. The lockable bolt has an elongated and extended form with a apertured boss for receiving a padlock shackle. Further, the lockable bolt operates to open and close the ring closure. The shuttle wrench is captively held between the cap and the apertured boss of the bolt, and is slidably positionable between engagement with and disengagement from the lockable bolt. When the shuttle wrench is engaged, the lockable bolt is enabled, and, when the shuttle wrench is disengaged the rotation of the lockable bolt is disabled.

OBJECT AND FEATURES OF THE INVENTION

It is an object of the present invention to provide a lockable bolt of tamper-resistant construction.

It is a further object of the present invention to provide an inexpensive and effective lockable device for cooperative functioning with a chemical- and hazardous-waste-drum ring closure.

It is a yet further object of the present invention to provide security devices for open-head, 30-, 55-, and 80-gallon drums.

It is a still yet further object of the present invention to provide a shroud for preventing access to the bolt-head.

It is a feature of the present invention to include an engageable and disengageable bolt driver.

It is another feature of the present invention to have a free-spinning, bolthead shroud when the bolt driver is disengaged.

Other objects and features of the invention will become apparent upon review of the drawings and the detailed description which follow.

BRIEF DESCRIPTION OF THE DRAWINGS

In the following drawings, the same parts in the various views are afforded the same reference designators.

FIG. 1 is a perspective view of the Drum Lock Device of the present invention shown with a portion of an open head drum, a portion of a ring closure device, and a padlock holding the bolt driver in a disengaged position;

FIG. 2 is a perspective view of the Drum Lock Device of the present invention shown with the bolt driver in an engaged position;

FIG. 7 is a perspective view of the second embodiment of the Drum Lock Device of the present invention shown with a portion of an open head drum, a portion of a ring closure device, and a padlock holding the bolt driver in a disengaged position;

FIG. 8 is a partially cutaway side elevational view of the embodiment of FIG. 7 differing from the first embodiment by having a splined bolt driver portion and a splined shuttle wrench and shown with the bolt driver in an engaged position; and, FIG. 9 is a schematic view of the second embodiment showing cross-sections of elements of the bolt body juxtaposed upon cross-sections of elements of the shuttle wrench to illustrate functional interrelationships of the splined portions thereof.

DESCRIPTION OF THE PREFERRED EMBODIMENT

Figure 3:
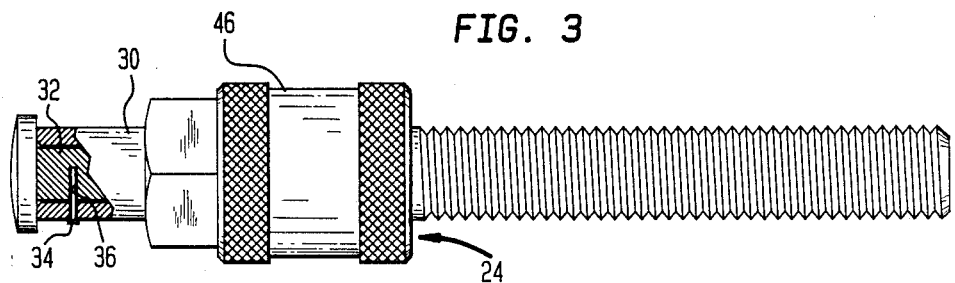
FIG. 3 is a side elevational view of the invention shown in FIG. 2 with the bolt driver in an engaged position.
Figure 4:
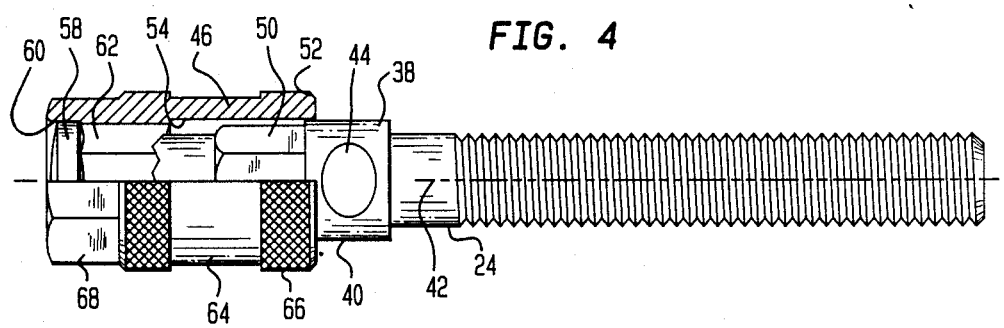
FIG. 4 is a side elevational view of the invention shown in FIG. 2, but with the bolt driver in a disengaged position.

Referring now to FIGS. 1 through 6, the drum lock device of this invention is shown and is referred to generally by the numeral 10. In the best mode of practicing the present invention, the drum lock device incorporates a lug-type ring closure 12 and a padlock 14. The drum lock device 10 is adapted for use with a 30-, a 55-, or an 80-gallon drum as is commonly employed with chemicals and hazardous materials. The padlock 14 has a shackle 16 which is locked and unlocked in the usual fashion. In the embodiment shown, an open-head, 55-gallon steel drum is equipped with closure rings having lug ends 18 with standard D.O.T. ⅜"-11 interior threads 20. In the prior art, these lug ends 18 are fastened together by a hex head, D.O.T. ⅜"-11 bolt (not shown). In the drum lock device 10 of the present invention, a lockable bolt 22 having an elongated and extended form is used. In the lockable bolt 22, a bolt assembly 24 is constructed to include a bolt body 26 with an exteriorly threaded portion 28 at one end and an extended shank 30 with an attachable cap 32 at the other or capreceiving end thereof. Although other means of attachment may be employed, in the best mode of practicing the invention, the attachable cap 32 is staked or pinned to the bolt body 26 by pin 34 into blind hole 36. Adjacent the threaded portion 28 and medial the ends of the bolt body 26, a boss or shackle-receiving portion 38 is formed having a smooth outer periphery 40 of a predetermined radius. The boss 38 is concentric with the bolt body 26 being coaxial with longitudinal axis 42. An eccentric aperture or shackle hole 44 is constructed in boss 38 of which the major axes of the elliptical cross sections thereof lie in a plane normal to longitudinal axis 42. The boss 38 and the attachable cap 32 structure of the bolt assembly 24 enable the mounting therebetween of a captive shuttle wrench 46, which is described in detail hereinbelow. For the purpose of this disclosure, a shuttle wrench is defined as a sleeve-type wrench held captive on the shank of a bolt with the driver portion of the wrench slidably engageable with and disengageable from the driver portion of the bolt. Adjacent the shackle-receiving portion 38 and the cap-receiving portion 48, a bolt-driver portion 50 is constructed for interlocking with the shuttle wrench 46. Although other interlockable shapes, such as splined, keyed or square, may be employed, in the best mode of practicing this invention, the bolt-driver portion 50 hereof is hexagonal in cross section.

Figure 5:
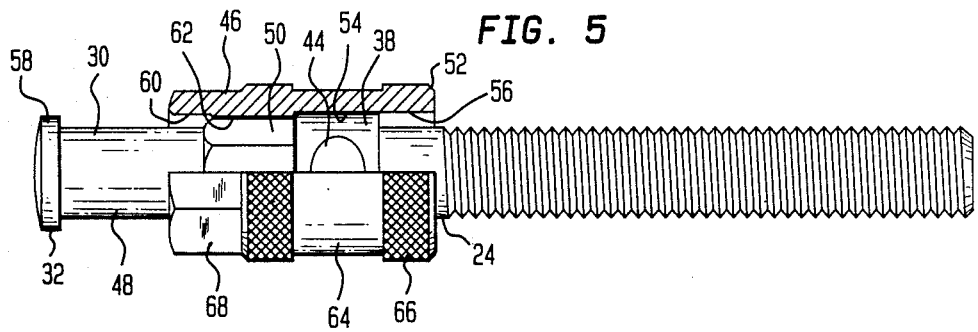
FIG. 5 is a partially cutaway side elevational view of the invention as shown in FIG. 3 with the bolt driver in an engaged position.

Referring now to FIG. 5, the shuttle wrench construction is next described. The shuttle wrench 46 is a sleeve 52 mountable between and held captive by cap 32 and boss 38. In the structure at hand, the shuttle wrench is dimensioned to move in axial relation to the bolt assembly 24 so as to shuttle between positions of engagement with and disengagement from the wrench. The inner wall 54 of the sleeve, which, when mounted as described above, is adjacent and surrounding the boss 38, is constructed with a smoothwalled inner cylindrical portion 56 which is in close tolerance with and slightly larger than the peripheral surface 40 of boss 38. The attachable cap 32 is constructed with an outer edge 58 which is smooth and circular in the cross-sectional aspect thereof. The inner wall 54 of the sleeve, which, when mounted as described above, is adjacent the cap 32, is constructed with a smooth-walled inner cylindrical portion 60 which is in close tolerance with and slightly larger than the peripheral surface 58 of cap 32. The best mode structure is such that, when the shuttle wrench 46 is fully disengaged, the shuttle wrench is journalled on peripheral surfaces 40 and 58 and spins freely thereupon. Additionally, the inner wall 54 of shuttle wrench 46 is constructed with a broached interior hex section or shuttle-driver portion 62 medial surfaces 56 and 60 for engagement with and disengagement from the external hex section or bolt-driver portion 50. The outer wall 64 of the shuttle wrench 46 is constructed with a knurled portion 66 and an external hexagonal section 68 for tightening, when the driver portions are in engagement either by hand or by suitable tooling, respectively.

Figure 6:
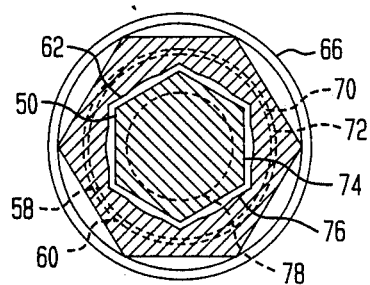
FIG. 6 is a schematic view of the first embodiment showing cross-sections of elements of the bolt body juxtaposed upon cross-sections of elements of the shuttle wrench to illustrate functional interrelationships of the hexagonal portions thereof.

Referring now to FIG. 6, the functional/dimensional aspects of the device are considered herein in terms of hexagonal fittings; however, the same analysis may be applied in terms of splined, keyed or square interlockable shapes. For the drum lock device to function properly as described in some detail hereinabove, the inner cylindrical portion 56 and the peripheral surface 40 are in close tolerance one to the other. These cross-sectional circular forms 70 and 72, respectively, are circumscribable about the interior hexagonal 74 and the mating exterior hexagonal 76 (cross-sections of 50 and 62, respectively). Likewise, the cross-sectional circular form 78 of the cap-receiving portion 48 is inscribable within hexagonals 74 and 76.

The description which follows is of a second embodiment of the drum lock device. For ease of comprehension, where similar parts are used reference designators "100" units higher are employed. Thus, the shuttle wrench 146 of the second embodiment is analogous to the shuttle wrench 46 of the first embodiment. Referring now to FIGS. 7, 8, and 9, the drum lock device of this second embodiment is shown and is referred to generally by the numeral 110. In the best mode of practicing the present invention, the drum lock device incorporates a lug-type ring closure 112 and a padlock 114. The drum lock device 110 is adapted for use with a 30-, a 55-, or an 80-gallon drum as is commonly employed with chemicals and hazardous materials. The padlock 114 has a shackle 116 which is locked and unlocked in the usual fashion. In the embodiment shown, an open-head, 55-gallon steel drum is equipped with closure rings having lug ends 118 with standard D.O.T. ⅜"-11 interior threads 120. In the prior art, these lug ends 118 are fastened together by a hex head, D.O.T. ⅜"-11 bolt (not shown). In the drum lock device 110 of this embodiment, a lockable bolt 122 having an elongated and extended form is used. In the lockable bolt 122, a bolt assembly 124 is constructed to include a bolt body 126 with an exteriorly threaded portion 12B at one end and an extended shank 130 with an attachable cap 132 at the other or capreceiving end thereof. Although other means of attachment may be employed, in the best mode of practicing the invention, the attachable cap 132 is staked or pinned to the bolt body 126 by pin 134 into blind hole 136. Adjacent the threaded portion 128 and medial the ends of the bolt body 126, a boss or shackle-receiving portion 138 is formed having a smooth outer periphery 140 of a predetermined radius. The boss 138 is concentric with the bolt body 126 being coaxial with longitudinal axis 142. An eccentric aperture or shackle hole 144 is constructed in boss 138 of which the major axes of the elliptical cross sections thereof lie in a plane normal to longitudinal axis 142. The boss 138 and the attachable cap 132 structure of the bolt assembly 124 enable the mounting therebetween of a captive shuttle wrench 146, which is described in detail hereinbelow. For the purpose of this disclosure, a shuttle wrench is defined as a sleeve-type wrench held captive on the shank of a bolt with the driver portion of the wrench slidably engageable with and disengageable from the driver portion of the bolt. Adjacent the shackle-receiving portion 138 and the cap-receiving portion 148, a bolt-driver portion 150 is constructed for intermeshing with the shuttle wrench 146. Although other interlockable shapes, such as hexagonal, square or keyed, may be employed, in this second embodiment of this invention, the bolt-driver portion 150 hereof is an external spline.

Referring now to FIG. 8 and 9, the shuttle wrench construction is next described. The shuttle wrench 146 is a sleeve 152 mountable between and held captive by cap 132 and boss 138. In the structure at hand, the shuttle wrench is dimensioned to move in axial relation to the bolt assembly 124 so as to shuttle between positions of meshing engagement with and disengagement from the wrench. The inner wall 154 of the sleeve, which, when mounted as described above, is adjacent and surrounding the boss 138, is constructed with a smooth-walled inner cylindrical portion 156 which is in close tolerance with and slightly larger than the peripheral surface 140 of boss 138. The attachable cap 132 is constructed with an outer edge 158 which is smooth and circular in the cross-sectional aspect thereof. The inner wall 154 of the sleeve, which, when mounted as described above, is adjacent the cap 132, is constructed with a smooth-walled inner cylindrical portion 160 which is in close tolerance with and slightly larger than the peripheral surface 158 of cap 132. The best mode structure is such that, when the shuttle wrench 146 is fully disengaged, the shuttle wrench is journalled on peripheral surfaces 140 and 158 and spins freely thereupon. Additionally, the inner wall 154 of shuttle wrench 146 is constructed with a internal spline section or shuttle-driver portion 162 medial surfaces 156 and 160 for meshing engagement with and disengagement from the external spline section or bolt-driver portion 150. The outer wall 164 of the shuttle wrench 146 is constructed with a knurled portion 166 and an external hexagonal section 168 for tightening, when the driver portions are in engagement either by hand or by suitable tooling, respectively.

Referring now to FIG. 9, the functional/dimensional aspects of the device are considered herein in terms of splined fittings. For the drum lock device to function properly as described in some detail hereinabove, the inner cylindrical portion 156 and the peripheral surface 140 are in close tolerance one to the other. These cross-sectional circular forms 170 and 172, respectively, are circumscribable about the internal spline 174 and the mating exterior spline 176 (cross-sections of 150 and 162, respectively). Likewise, the cross-sectional circular form 178 of the cap-receiving portion 148 is inscribable within spline outlines 174 and 176.

In operation, the shuttle wrench functions in two positions, when the drum is locked, that is with a padlock shackle placed through the shackle opening, the sliding barrel is forced to a free-spinning position (the I.D. of the broached hex section being larger than the spin-free section of the extension bolt). In the free-spinning or disengaged position, the attachable cap is seated within the sleeve recess and access to the cap is limited and protected thereby. When the padlock is removed, the sliding bar is moved downwards over the bolt covering the shackle opening with the hex head engaging the hex driver section of the bolt. At all times, with the shuttle wrench engaged with or disengaged from the driver, the driver portion is protected by the sleeve.

Although the present invention has been described with reference to particularly embodiment and examples, it will be apparent to those skilled in the art that variations and modifications can be substituted therefore without departing from principles and true spirit of the invention. The abstract given herewith is for the convenience of technical searches and is not for the interpretation of the scope of the invention.

What is claimed is:

1. A drum lock device for an open-head drum having a flanged lip at the open end with a mating lid therefor, said drum lock device comprising, in combination:

lug-type ring closure means for annularly attaching said lid to said lip, said ring closure means having a split therethrough with internally threaded lugs on either side thereof;

a lockable bolt having an elongated and extended form with a apertured boss medial the ends thereof, said lockable bolt threadedly attachable to said lugs and, upon rotation of said lockable bolt, operative to widen and narrow said split;

a cap attached to one end of said lockable bolt;

a shuttle wrench captively held between said cap and said apertured boss of said lockable bolt, said shuttle wrench slidably positionable between engagement with and disengagement from said lockable bolt;

whereby, when said shuttle wrench is engaged, the rotation of the lockable bolt is enabled, and, when said shuttle wrench is disengaged the rotation of the lockable bolt is disabled.

2. A drum lock device as described in claim 1, wherein said shuttle wrench further comprises:

(1) an interior, wrench-driver portion slidably engageable with and disengageable from a corresponding portion of said lockable bolt; and, (2) an exterior, wrench-fitting portion in the outer surface of said shuttle wrench.

3. A drum lock device as described in claim 2, wherein said wrench-driver and said corresponding portion of said lockable bolt are polygonal in cross section.

4. A drum lock device as described in claim 3, wherein said polygonal wrench-driver and said corresponding portion of said lockable bolt are hexagonal.

5. A drum lock device as described in claim 2, wherein said wrench-driver and said corresponding portion of said lockable bolt are internal and external splines, respectively.

6. A drum lock device as described in claim 1, wherein said a lockable bolt further comprises:
a bolt body;
(a) a threaded portion at one end of said bolt body of generally cylindrical shape, said threaded portion having threads on the exterior surface thereof, said threads being adapted to engage the internal threads of said lugs;
(b) a cap-receiving portion at the end opposite said threaded portion having a smooth, circular outer surface of a first predetermined radius;
(c) a shackle-receiving portion medial said threaded portion and said cap-receiving portion having an aperture therethrough for receiving a shackle and a smooth, annular outer surface of a second predetermined radius; and,
(d) a bolt-driver portion medial said shackle-receiving portion and said cap-receiving portion engageable to facilitate rotation of the lockable bolt.

7. A drum lock device as described in claim 6, wherein said wrench-driver and said corresponding portion of said lockable bolt are polygonal in cross section.

8. A drum lock device as described in claim 7, wherein said polygonal wrench-driver and said corresponding portion of said lockable bolt are hexagonal.

9. A drum lock device as described in claim 6, wherein said wrench-driver and said corresponding portion of said lockable bolt are internal and external splines, respectively.

10. A drum lock device for an open-head drum having a flanged lip at the open end with a mating lid therefor, said drum lock device comprising, in combination:
lug-type ring closure means for annularly attaching said lid to said lip, said closure means having a split therethrough with internally threaded lugs on either side thereof;
a lockable bolt having an elongated and extended form with a apertured boss medial the ends thereof, said lockable bolt threadedly attachable to said lugs and, upon rotation of said lockable bolt, operative to widen and narrow said split, and, in turn, further comprising:
a bolt body;
(a) a threaded portion at one end of said bolt body of generally cylindrical shape, said threaded portion having threads on the exterior surface thereof, said threads being adapted to engage the internal threads of said lugs;
(b) a cap-receiving portion at the end opposite said threaded portion having a smooth, circular outer surface of a first predetermined radius;
(c) a shackle-receiving portion medial said threaded portion and said cap-receiving portion having an aperture therethrough for receiving a shackle and a smooth, annular outer surface of a second predetermined radius; and,
(d) a bolt-driver portion medial said shackle-receiving portion and said cap-receiving portion engageable to facilitate rotation of the lockable bolt;
cap means attached to said bolt body at the cap-receiving portion having a smooth, annular outer surface of a third predetermined radius;
a shuttle wrench captively held by said cap means and said shackle-receiving portion of said bolt body;
whereby, when said sleeve-driver portion and said bolt-driver portion are engaged, the rotation of the lockable bolt is enabled, and, when said sleeve-driver portion and said bolt-driver portion are disengaged the rotation of the lockable bolt is disabled.

11. A drum lock device as described in claim 10, wherein said wrench-driver and said corresponding portion of said lockable bolt are polygonal in cross section.

12. A drum lock device as described in claim 11, wherein said polygonal wrench-driver and said corresponding portion of said lockable bolt are hexagonal.

13. A drum lock device as described in claim 10, wherein said wrench-driver and said corresponding portion of said lockable bolt are internal and external splines, respectively.

14. A drum lock device as described in claim 10, further including a padlock wherein, upon the shackle of said padlock being inserted in said aperture, said shuttle wrench is disabled and journalled upon the said bolt outer surface of said second predetermined radius and upon said cap means outer surface of said third predetermined radius.

15. A lockable bolt having an elongated and extended form comprising, in combination:
A. a bolt assembly, in turn, comprising:
(1) a bolt body;
(a) a threaded portion at one end of said bolt body of generally cylindrical shape, said threaded portion having threads on the exterior surface thereof, said threads being adapted to engage interiorly threaded fittings;
(b) a cap-receiving portion at the end opposite said threaded portion having a smooth, circular outer surface of a first predetermined radius;
(c) a shackle-receiving portion medial said threaded portion and said cap-receiving portion having an aperture therethrough for receiving a shackle and a smooth, annular outer surface of a second predetermined radius;
(d) a bolt-driver portion medial said shackle-receiving portion and said cap-receiving portion engageable to facilitate rotation of the lockable bolt;
(2) cap means attached to said bolt body at the cap-receiving portion having a smooth, annular outer surface of a third predetermined radius;
B. a sleeve means captively held between said cap means and said shackle-receiving portion of said bolt body;
whereby, when said sleeve-driver portion and said bolt-driver portion are engaged, the rotation of the lockable bolt is enabled, and, when said sleeve-driver portion and said bolt-driver portion are disengaged the rotation of the lockable bolt is disabled.

16. A lockable bolt as described in claim 15, wherein said sleeve means further comprises:
(1) an interior, wrench-driver portion slidably engageable with and disengageable from a corresponding portion of said bolt assembly; and,
(2) an exterior, wrench-fitting portion in the outer surface of said sleeve means.

17. A lockable bolt as described in claim 16, wherein said wrench-driver and said corresponding portion of said bolt assembly are polygonal in cross section.

18. A lockable bolt as described in claim 17, wherein said polygonal wrench-driver and said corresponding portion of said bolt assembly are hexagonal.

19. A lockable bolt as described in claim 16, wherein said wrench-driver and said corresponding portion of said bolt assembly are internal and external splines, respectively.

20. A lockable bolt as described in claim 16, further including a padlock wherein, upon the shackle of said padlock being inserted in said aperture, said sleeve means is disabled and is journalled upon the said bolt outer surface of said second predetermined radius and upon said cap means outer surface of said third predetermined radius.

* * * * *